US006487296B1

(12) United States Patent
Allen et al.

(10) Patent No.: US 6,487,296 B1
(45) Date of Patent: Nov. 26, 2002

(54) WIRELESS SURROUND SOUND SPEAKER SYSTEM

(76) Inventors: Steven W. Allen, Rte. 1 Box 400, Sparks, GA (US) 31647; Carey L. Norton, Rte. 1 Box 400, Sparks, GA (US) 31647

( * ) Notice: Subject to any disclaimer, the term of this patent is extended or adjusted under 35 U.S.C. 154(b) by 0 days.

(21) Appl. No.: 09/163,899

(22) Filed: Sep. 30, 1998

(51) Int. Cl.[7] .......................... H04B 3/00; H04H 5/00; H04R 5/02

(52) U.S. Cl. .............................. 381/80; 79/2; 79/307; 79/3

(58) Field of Search .......................... 381/1, 2, 77, 79, 381/80, 85, 98, 103, 307

(56) References Cited

U.S. PATENT DOCUMENTS

| | | | | | |
|---|---|---|---|---|---|
| 3,590,382 | A | | 6/1971 | Kenney | 325/36 |
| 4,612,665 | A | * | 9/1986 | Inami et al. | 381/98 |
| 4,899,388 | A | | 2/1990 | Mlodzikowski et al. | 381/77 |
| 5,182,552 | A | * | 1/1993 | Paynting | 340/825.25 |
| 5,218,641 | A | | 6/1993 | Abe et al. | 381/79 |
| 5,361,381 | A | * | 11/1994 | Short | 381/79 |
| 5,666,422 | A | | 9/1997 | Harrison et al. | 381/18 |
| 5,666,658 | A | | 9/1997 | Borchardt et al. | 455/42 |
| 5,668,884 | A | * | 9/1997 | Clair, Jr. et al. | 381/82 |
| 5,673,323 | A | | 9/1997 | Schotz et al. | 381/2 |
| 5,708,718 | A | * | 1/1998 | Ambourn et al. | 381/1 |
| 6,154,549 | A | * | 11/2000 | Arnold et al. | 381/104 |
| 6,198,825 | B1 | * | 3/2001 | Daryanani | 381/3 |

* cited by examiner

*Primary Examiner*—Forester W. Isen
*Assistant Examiner*—Brian T. Pendleton
(74) *Attorney, Agent, or Firm*—John D. Gugliotta

(57) ABSTRACT

Disclosed is a wireless surround sound speaker system wherein a transmitter broadcasts a variety of FM signals that correspond to the individual speaker channels commonly found in a surround sound system. Receivers, individually equipped with signal receiving, conditioning and amplification components, are configured to receive any one of the broadcast signals in a remote location and are used to drive a conventional loudspeaker in that location. Powered by wall socket or via DC battery packs, the receivers, used in conjunction with the transmitter, provide surround sound capabilities without the need for complex and difficult wiring.

10 Claims, 4 Drawing Sheets

WIRELESS SURROUND SOUND SPEAKER SYSTEM

BACKGROUND OF THE INVENTION

1. Field of the Invention

The present invention relates generally to wireless speaker systems and more specifically to a wireless surround sound speaker system in which a transmitting unit transmits separate and distinct signals for all of the various output channels requisite of surround sound processing.

2. Description of the Related Art

Home theater entertainment systems are becoming increasingly sophisticated and complex. Typical surround sound systems incorporate at least five speakers: front right and left speakers, rear right and left speakers and a front center speaker, requiring that a number of loudspeakers be placed throughout the viewing room, on all sides of the listener/viewer, in order to achieve the desired audio effects. In fact, in some home theater systems, speakers are also placed throughout the entire house in order to broadcast music to every room when the theater effects are not in use. As a result, a multitude of speaker wires must be run throughout the room and the house to each speaker which can be extremely difficult to accomplish. Also, the fact that there is an individual channel associated with each of the surround sound speakers that makes attaching a speaker wire to the correct receiver output channel and speaker equally troublesome. Accordingly, there is a need for a means by which the surround sound speakers can be placed and used throughout a room, or even an entire home, while avoiding the burdens associated with wiring such speakers and adjusting their channel selection and equalization settings. The development of the present invention fulfills this need. To accomplish this, switchable receiving units are tuned to a desired transmitter output channel and include an integrated amplifier, signal biasing capabilities and a graphic equalizer for adjusting the tonal characteristics of the individual speaker to which it is connected, thereby allowing use of the present invention interchangeably with existing loudspeaker arrangements and adjusted at a remote location.

A search of the prior art did not disclose any patents that read directly on the claims of the instant invention. However, several references disclose wireless speaker systems in which FM or infrared signals are transmitted to speakers that are equipped with signal receiving and amplification electronics that are used to drive the loudspeakers. While many of these inventions touch upon the principles of surround sound processing and wireless signal transmission, none of these devices include any individualized channel selection or equalization features that allow the speakers to be used interchangeably and therefore neither anticipate nor disclose any embodiment that would preclude its novelty and the utilitarian functionality of the present invention:

U.S. Pat. No. 5,708,718, issued in the name of Ambourn et al.;

U.S. Pat. No. 5,666,658, issued in the name of Borchardt et al.;

U.S. Pat. No. 5,666,422, issued in the name of Harrison et al.;

U.S. Pat. No. 5,673,323, issued in the name of Schotz et al.;

U.S. Pat. No. 5,218,641, issued in the name of Abe et al.;

U.S. Pat. No. 4,899,388, issued in the name of Mlodzikowski et al.; and

U.S. Pat. No. 3,590,382, issued in the name of Kenney.

The ’718 patent, issued in the name of Ambourn et al., discloses a surround sound processor system in which an audio signal is decoded into in-phase and out-of-phase components. The in-phase signals are sent via FM transmitter to a receiver component that is connected to an amplifier that boosts the signal, driving the center channel loudspeaker(s). The out-of-phase signals are sent via FM transmitter to a receiver component that is connected to an amplifier that boosts the signal, driving the rear channel loudspeaker(s). This disclosure differs from the present invention in that the receiver/amplifier portions are not integrated into the speaker design which necessitates further wiring in the remote location. Furthermore, the ’718 invention requires the use of external wiring connections between the receiver/amplifier combination, making likely the occurrence of the problems to which the present invention is directed.

The ’658 patent, issued in the name of Borchardt et al., discloses a wireless signal transmission system wherein an audio signal is via FM transmission to a pair of wireless headphones. The disclosure neither discloses nor anticipates any surround sound applications utilizing loudspeakers with integrated signal receiving, amplification channel selection and graphic equalization capabilities.

The ’422 patent, issued in the name of Harrison et al., discloses a remote speaker arrangement for surround sound applications intended to eliminate the need for front channel speakers. The wireless rear speakers are used to create “phantom” front speakers by combining a bipolar rear speaker with a mono front speaker. This arrangement, however, requires that the speakers be wired to a combination receiver/amplifier in the remote location and therefore suffers from the drawbacks that the present invention solves. The disclosure neither discloses nor anticipates any surround sound applications utilizing loudspeakers with integrated signal receiving, amplification channel selection and graphic equalization capabilities.

The ’323 patent, issued in the name of Schotz et al., discloses an analog spread spectrum wireless speaker system intended to allow the user to place a pair of speakers at a remote location without the need to run speaker wires. The ’641 patent, issued in the name of Abe et al., discloses a wireless receiver for use with headphones or loudspeakers. The device consists of a transmitter that transmits infrared radiation signals, modulated by an audio signal, to an infrared receiver that translated the signal to an audio signal and amplifies it for use with headphones or loudspeakers at a remote location. These disclosures differ from the present invention in that the receiver/amplifier portions are not integrated into the speaker design which necessitates further wiring in the remote location. Furthermore, the disclosures neither disclose nor anticipate any surround sound applications utilizing loudspeakers with integrated signal receiving, amplification channel selection and graphic equalization capabilities.

U.S. Pat. No. 4,899,388, issued in the name of Mlodzikowski et al., discloses an infrared speaker system in which a pair of remotely located speakers are fit individually with an infrared receiver and an audio amplifier. An infrared transmitter connected to a stereo or the like converts both left and right channel audio signals to an infrared signal and sends them to the speakers. Each speaker receiver is equipped with a filter that selects the appropriate channel, left or right, converts it to an audio signal and amplifies it, driving the loudspeaker. The ’382 patent, issued in the name of Kenney, discloses a remote speaker system similar in nature to that of the '388 disclosure, the main difference being that an infrared signal rather than an FM signal is used to transmit the audio signal. While these disclosures do anticipate individual reception and amplification components in each speaker, the speakers are still limited to a single, non-selectable channel. Furthermore, the disclosures neither disclose nor anticipate any surround sound applications utilizing loudspeakers with integrated signal receiving, amplification channel selection and graphic equalization capabilities.

While several features exhibited within these references may be incorporated into this invention, alone and in combination with other elements, the present invention is sufficiently different so as to make it distinguishable over the prior art.

SUMMARY OF THE INVENTION

The present invention consists of a system uses a transmitting unit that emits a low level FM signal for each of the surround sound speaker channels. The transmitting unit incorporates surround sound processing circuitry that in which the user can select the desired effect to apply to the signals, from large concert hall to intimate club settings, along with conventional front-rear biasing, right-left biasing and graphic equalization capabilities. Individual receiving units, powered either by DC battery supply or conventional AC wall socket, are used to receive the transmitted signal and drive existing loudspeaker arrangements. The receiving unit includes electronic components that receive the respective speaker channel signal, convert it to an audio signal and amplifies it in order to drive the loudspeaker. Each receiving unit is fit with a channel selection switch that allows it to be configured to receive and amplify any of the surround sound channel signals transmitted by the transmitting unit. Furthermore, each receiving unit includes individual left-right biasing, front-rear biasing and graphic equalization and volume adjustment capabilities that can be enabled and used in the remote location, defeating the settings of the transmitting unit in the scenario where users in different locations or rooms are listening to the same selection.

It is therefore an object of the present invention to provide a wireless speaker system wherein a transmitting unit and a receiving unit allows the user to place speakers about a room or rooms without running speaker wires from stereo components to each individual speaker assembly.

It is another object of the present invention to provide a wireless speaker system in which each receiving unit is fully self sufficient, being powered either a battery powered DC supply or a power cord plugged into a conventional wall socket.

It is another object of the present invention to provide a wireless speaker system in which a transmitter unit transmits individual channel signals, in stereo or surround sound, on an FM frequency.

It is another object of the present invention to provide a wireless speaker system in which a transmitter unit includes the ability to adjust the settings for the left-right biasing, front-rear biasing, graphic equalization and volume of the transmitted signal(s).

It is another object of the present invention to provide a wireless speaker system in which the use of a receiver assembly allows for use of the wireless speaker system with existing loudspeaker arrangements.

It is another object of the present invention to provide a wireless speaker system in which each individual receiver assembly can be configured to receive any of the stereo or surround sound signals transmitted by the transmitter unit.

Finally, It is an object of the present invention to provide a wireless speaker system in which each receiver assembly allows the user to adjust the individual settings for the left-right biasing, front-rear biasing, graphic equalization and volume of the transmitted signal(s), defeating those of the transmitter unit.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

10 Speaker System
11 Listener
12 Television
13 Transmitter
14 Receiver
15 Front-Left Speaker
16 Front Right-Speaker
17 Center Speaker
18 Rear-Left Speaker
19 Rear-Right Speaker
20 Transmitter Control Panel
21 Graphic Equalizer
22 Sliding Knobs
23 Balance Knob
24 Fader Knob
25 Volume Knob
26 Surround Sound Effects Buttons
27 Power Switch
30 Loudspeaker
31 Speaker
32 Receiver Control Panel
33 Air Port
34 Graphic Equalizer
35 Sliding Knobs
36 Balance Knob
37 Fader Knob
38 Volume Knob
39 Conditioning Selection Switch 40 Channel Selection Knob
41 Power Switch
42 Power Cord
43 Two-Prong Plug
50 Home Theater/Stereo System
51 Sound Signals
52 Left Channel
53 Right Channel
54 Surround Sound Processor
55 In-Phase Sound Signal
56 Front-Left Sound Signal
57 Front-Right Sound Signal
58 Out-Of-Phase Sound Signal
59 Rear-Left Sound Signal
60 Rear-Right Sound Signal
65 In-Phase Transmitter Signal
66 Out-Of-Phase Transmitter
67 In-Phase Broadcast Signal
68 Out-Of-Phase Broadcast Signal
70 Signal Level Conditioning Circuitry
71 Conditioned In-Phase Sound Signal
72 Conditioned Front-Left Sound Signal
73 Conditioned Front-Right Sound Signal
74 Conditioned Out-Of-Phase Sound Signal
75 Conditioned Rear-Left Sound Signal
76 Conditioned Rear-Right Sound Signal
80 Conditioned In-Phase Transmitter
81 Conditioned Out-Of-Phase Transmitter
82 Conditioned In-Phase Broadcast Signal
83 Conditioned Out-Of-Phase Broadcast Signal
90 Conditioned In-Phase Signal Receiver
91 Conditioned Out-Of-Phase Signal Receiver
92 Conditioned Signal Decoder
93 First Selected Conditioned Signal
100 In-Phase Signal Receiver
101 Out-Of-Phase Signal Receiver
102 Unconditioned Signal Decoder
103 Selected Signal
105 Signal Level Conditioning Circuitry
106 Second Selected Conditioned
110 Amplifier

DESCRIPTION OF THE PREFERRED EMBODIMENT

1. Description of the Preferred Embodiment

Figure 1:
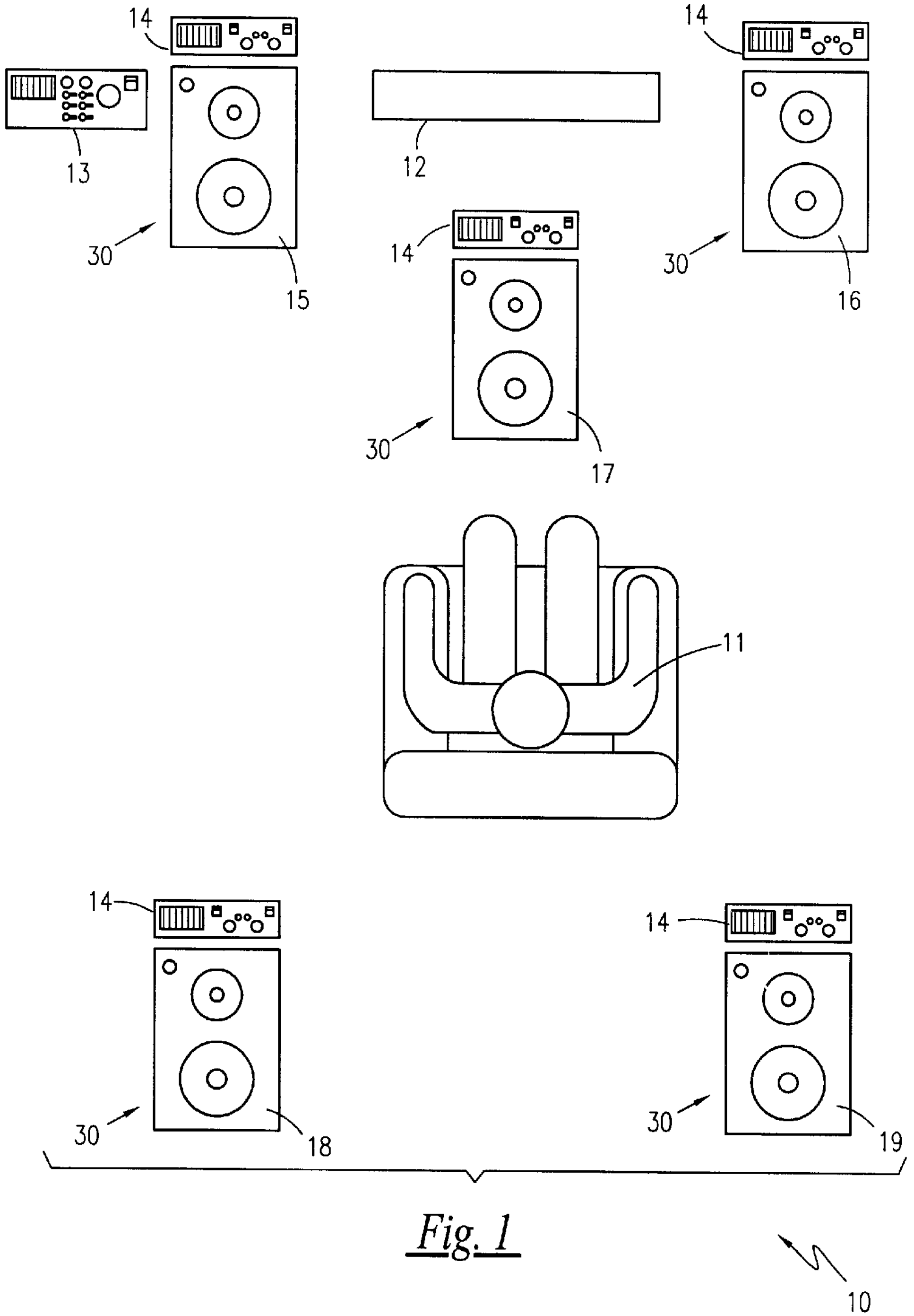
FIG. 1 is a plan view of the wireless surround sound speaker system, according to the preferred embodiment of the present invention.

Referring now to FIG. 1, depicted is a plan view of the remote surround sound speaker system, hereinafter speaker system 10. The speaker system 10 is depicted in this figure in a surround sound home theater application where the listener 11 is viewing a television 12 upon which a motion picture or other program where the listener 11 may desire surround sound effects. The transmitter 13 transmits wireless signals to several receivers 14 that, in turn, are used to drive a front-left speaker 15, a front right-speaker 16, a center speaker 17, a rear-left speaker 18 and a rear-right speaker 19, broadcasting the appropriate sounds via loudspeakers 30 required to create the desired surround sound effect. As will be described in further detail herein below, the individual receivers 14 are identical in construction and can be configured so as assume the configuration of any of the aforementioned position-specific speakers (front-left, front-right, etc.). Furthermore, each receiver 14 is capable of either remote or local signal level conditioning wherein graphic equalization, balance adjustment, fader adjustment, and volume adjustment are applied to the signal broadcast by the transmitter 13.

Figure 2:
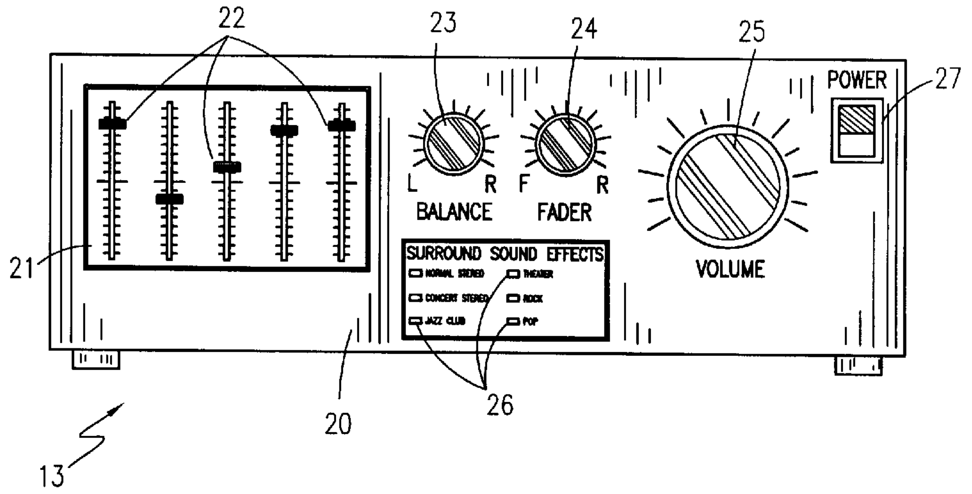
FIG. 2 is a front view of the transmitter component of the wireless surround sound speaker system, according to the preferred embodiment of the present invention.

Referring now to FIG. 2, depicted is the transmitter 13 that is used in conjunction with the speaker system 10. The transmitter control panel 20 houses the various controls that allow the user to define the operation of the transmitter 13. A graphic equalizer 21 allows for the adjustment of the tonal characteristics of the sound, on several bands, by use of individual sliding knobs 22. A balance knob 23 allows for the adjustment of the sound between the right and left channels. A fader knob 24 allows for the adjustment of the sound between front and rear channels. A volume knob 25 allows for the adjustment of the playing volume. An array of surround sound effects buttons 26 allow for the selection of a variety of surround sound effects to be applied to the broadcast signal. Connected to a conventional home entertainment or stereo system (not shown), the user can select from a variety of effects including normal stereo, concert hall, jazz club, theater, rock and pop. A power switch 27 allows the transmitter 13 to be powered on and off. The function of the controls located on the transmitter control panel 20 as they relate to the operation of the transmitter 13 will be discussed in further detail herein below.

Figure 3:
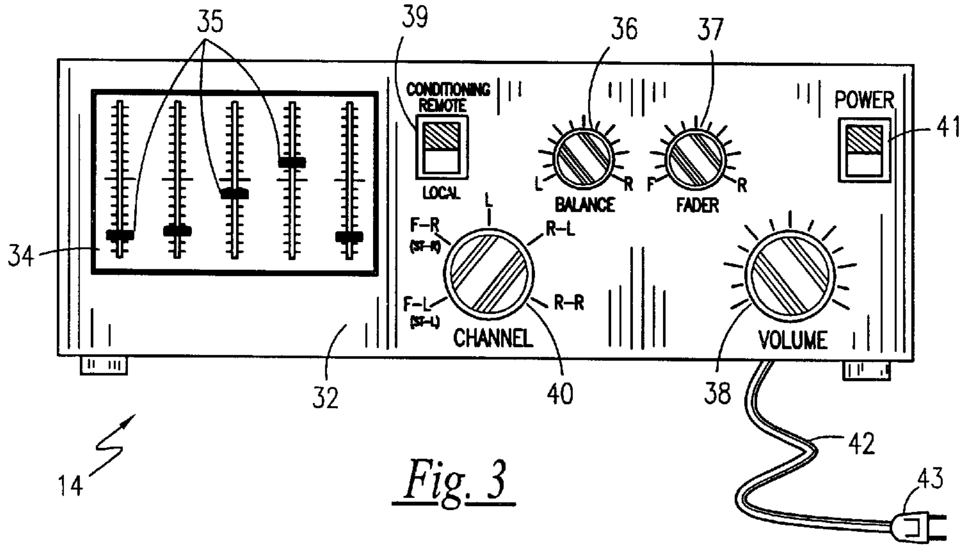
FIG. 3 is an enlarged front view of the control panel of the receiver unit component of the wireless surround sound speaker system, according to the preferred embodiment of the present invention.
Figure 4:
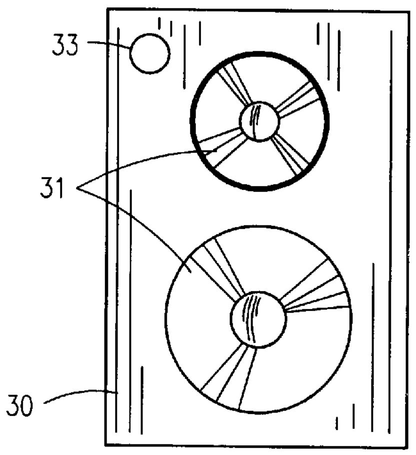
FIG. 4 is a front view of a conventional loudspeaker used in conjunction with the wireless surround sound speaker system, according to the preferred embodiment of the present invention.

Referring now to FIGS. 3 and 4, depicted is a receiver 14 for use in conjunction with the speaker system 10 to drive existing loudspeakers 30 without the need to run speaker wires (not shown) from the home entertainment or stereo system to each loudspeaker 30. The loudspeaker 30 supports at least one speaker 34 and an air port 33 and is connected to the receiver 14 via speaker wires (not shown). The receiver control panel 32 houses the various controls that allow the user to define the operation of the receiver 14. A graphic equalizer 34 allows for the adjustment of the tonal characteristics of the sound, on several bands, by use of individual sliding knobs 35. A balance knob 36 allows for the adjustment of the sound between the right and left channels. A fader knob 37 allows for the adjustment of the sound between front and rear channels. A volume knob 38 allows for the adjustment of the playing volume. A conditioning location selection switch, hereinafter conditioning selection switch 39 allows the user to select the location of the signal conditioning for that particular receiver 14. A channel selection knob 40 allows for individual channel selection on a per speaker basis. A power switch 41 allows the receiver 14 to be powered on and off. A power cord 42 with a two-prong plug 43 allows the speaker assembly to be powered by a conventional wall socket (not shown) and the receiver 14 includes an optional battery power supply (not shown) that allows the receiver to operate in a completely wireless(not including speaker wires), re-chargeable manner. The function of the controls located on the receiver control panel 32 as they relate to the operation of the receiver 14 will be discussed in further detail herein below.

2. Operation of the Preferred Embodiment

Figure 5:
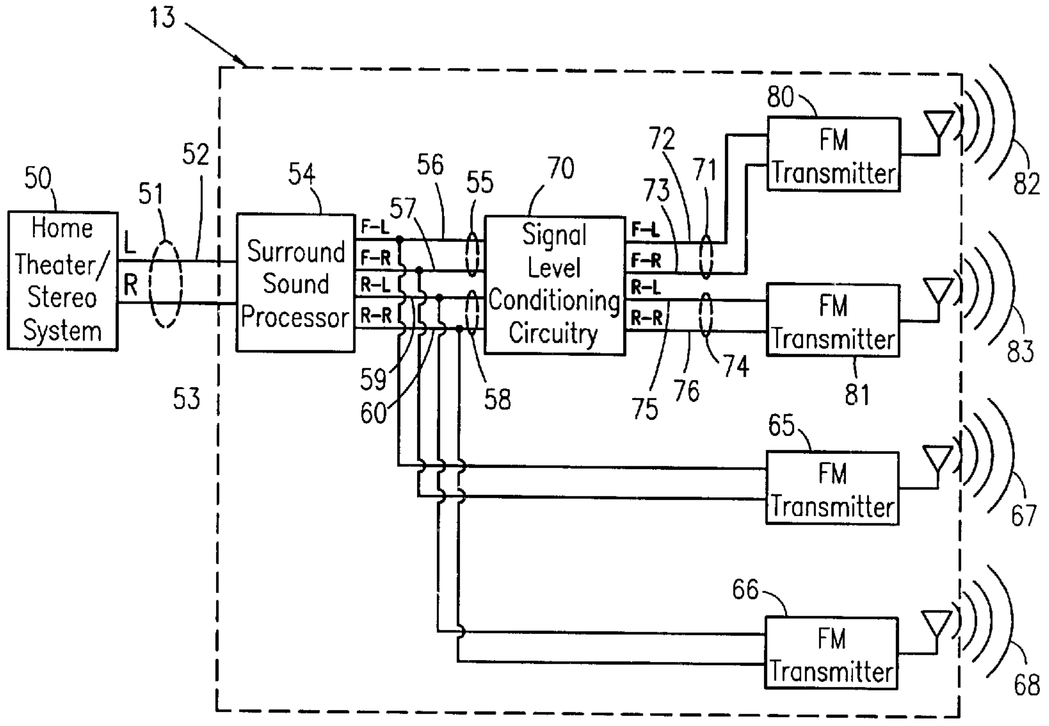
FIG. 5 is a block diagram depicting the operation of the transmitter component of the wireless surround sound speaker system, according to the preferred embodiment of the present invention.

In accordance with the preferred embodiment of the present invention and as shown in FIG. 5, the transmitter 13 used in conjunction with the speaker system 10 operates in the following manner. A home theater/stereo system 50 is used to feed sound signals 51, consisting of a left channel 52 and right channel 53, into the transmitter 13. The sound signals 51 can be that generated by a variety of devices including a stereo receiver, CD player, cassette deck, video disc, DVD, etc. (Not shown). The sound signals 51 are first processed by a surround sound processor 54 in which the desired effect as defined by the user-selected surround sound effects buttons 26. The surround sound processor 54 generates an in-phase sound signal 55 consisting of a front-left sound signal 56 and a front-right sound signal 57, and an out-of-phase sound signal 58 consisting of a rear-left sound signal 59 and a rear-right sound signal 60. The in-phase sound signal 55 and the out-of-phase sound signal 58 are fed to an in-phase transmitter 65 and an out-of-phase transmitter 66, respectively. The in-phase transmitter 65 and out-of-phase transmitter 66 consist of FM transmitters used to transmit an in-phase broadcast signal 67 and an out-of-phase broadcast signal 68.

The in-phase sound signal 55 and the out-of-phase sound signal 58 are also fed, in parallel, to signal level conditioning circuitry 70, where the in-phase sound signal 55 and the out-of-phase sound signal 58 are further conditioned in terms of tonal characteristics of the sound, adjustment of the sound between the right and left channels, adjustment of the sound between front and rear channels and playing volume as defined by the user on the transmitter control panel 20 via the graphic equalizer 21, balance knob 23, fader knob 24 and volume knob 25, respectively. The level conditioning circuitry 70 generates a conditioned in-phase sound signal 71 consisting of a conditioned front-left sound signal 72 and a conditioned front-right sound signal 73, and a conditioned out-of-phase sound signal 74 consisting of a conditioned rear-left sound signal 75 and a conditioned rear-right sound signal 76. The conditioned in-phase sound signal 71 and the conditioned out-of-phase sound signal 74 are fed to a conditioned in-phase transmitter 80 and a conditioned out-of phase transmitter 81, respectively. The conditioned in-phase transmitter 80 and the conditioned out-of-phase transmitter 81 consist of FM transmitters used to transmit a conditioned in-phase broadcast signal 82 and a conditioned out-of-phase broadcast signal 83.

Figure 6:
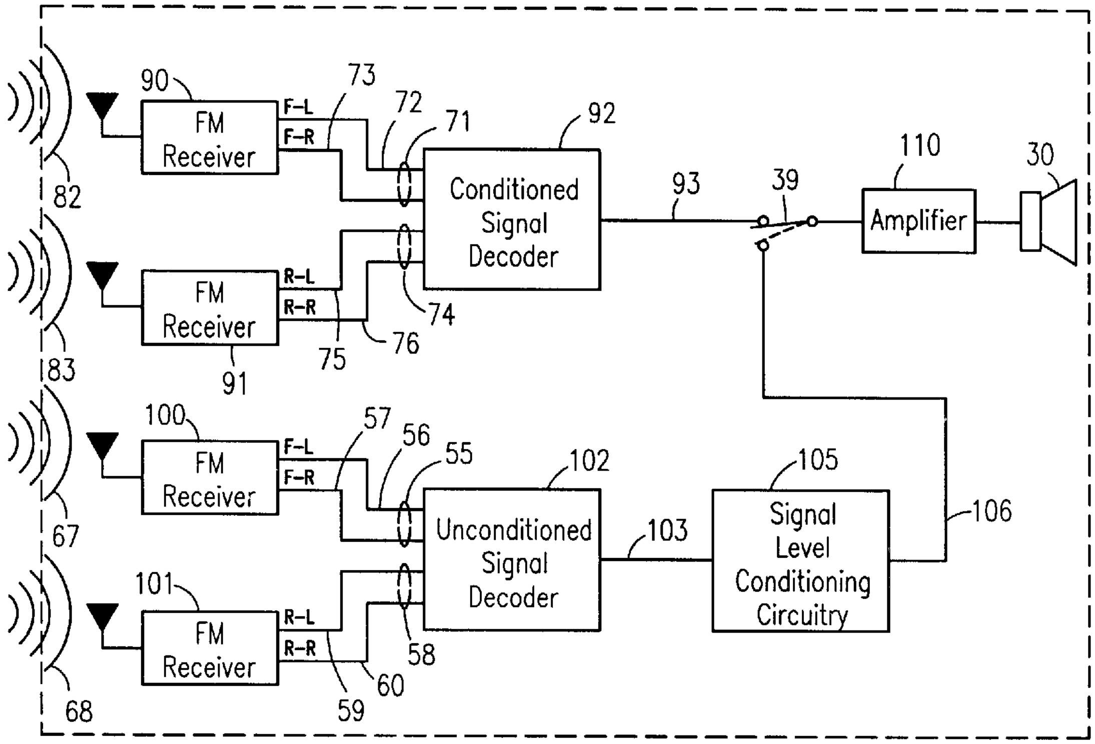
FIG. 6 is a block diagram depicting the operation of the receiver unit component of the wireless surround sound speaker system, according to the preferred embodiment of the present invention.

In FIG. 6, the receiver 14 used in conjunction with the speaker system 10 operates in the following manner. The conditioned in-phase broadcast signal 82 and the conditioned out-of-phase broadcast signal 83 are received by a conditioned in-phase signal receiver 90 and a conditioned out-of-phase signal receiver 91, respectively. The conditioned in-phase signal receiver 90 and conditioned out-of phase signal receiver 91 consist of FM receivers that retrieve the particular frequency generated by the conditioned in-phase transmitter 80 and the conditioned out-of-phase transmitter 81, respectively.

Once received by the conditioned in-phase signal receiver 90 and the conditioned out-of-phase signal receiver 91, the conditioned in-phase sound signal 71 and the conditioned out-of-phase sound signal 74 are sent to a conditioned signal decoder 92 wherein a single channel is selected, i.e. the conditioned front-left sound signal 72, the conditioned front-right sound signal 73, the conditioned rear-left sound signal 75, the conditioned rear-right sound signal 76, or a center signal (not shown), to be played by the particular receiver 14. The center signal is a combination of both the conditioned front-left sound signal 72 and the conditioned front-right sound signal 73, creating a monophonic signal. The selection is made by the user via the channel selection knob 40 located on the receiver control panel 32. Thus, a first selected conditioned signal 93 is produced by the conditioned signal decoder 92.

The in-phase broadcast signal 67 and an out-of-phase broadcast signal 68 are received by an in-phase signal receiver 100 and a out-of-phase signal receiver 101, respectively. The in-phase signal receiver 100 and out-of-phase signal receiver 101 consist of FM receivers that retrieve the particular frequency generated by the in-phase transmitter 65 and an out-of-phase transmitter 66, respectively.

Once received by the in-phase signal receiver 100 and the out-of-phase signal receiver 101, the in-phase sound signal 55 and the out-of-phase sound signal 58 are sent to an unconditioned signal decoder 102 wherein a single channel is selected, i.e. the front-left sound signal 56, the front-right sound signal 57, the rear-left sound signal 59, the rear-right sound signal 60, or a center signal (not shown), to be played by the particular receiver 14. The center signal is a combination of both the front-left sound signal 56 and the front-right sound signal 57, creating a monophonic signal. The selection is made by the user via the channel selection knob 40 located on the receiver control panel 32. Thus, a selected signal 103 is produced by the unconditioned signal decoder 102.

The selected signal 103 is fed to signal level conditioning circuitry 105, where it is further conditioned in terms of tonal characteristics of the sound, adjustment of the sound between the right and left channels, adjustment of the sound between front and rear channels and playing volume as defined by the user on the receiver control panel 32 via the graphic equalizer 34, balance knob 36, fader knob 37 and volume knob 38, respectively. The level conditioning circuitry 105 generates a second selected conditioned signal 106.

The first selected conditioned signal 93 and second selected conditioned signal 106 are connected to the conditioning selection switch 39, allowing the user to select which signal is sent to an amplifier 110 that drives the loudspeaker 30. In providing this selection capability, the user of the speaker system 10 can allow the transmitter 13 to condition the signal being listened to or can control it remotely in the location of the receiver 14.

While the preferred embodiments of the invention have been shown, illustrated, and described, it will be apparent to those skilled in this field that various modifications may be made in these embodiments without departing from the spirit of the present invention. It is for this reason that the scope of the invention is set forth in and is to be limited only by the following claims.

What is claimed is:

1. A remote surround sound speaker system comprising:

a transmitter for transmitting wireless signals to a plurality of receivers, said wireless signals are capable of driving at least a front-left speaker, a front right-speaker, a center speaker, a rear-left speaker and a rear-right speaker, wherein said transmitter is capable transmitting sound signals including a left channel and right channel, said sound signals being first processed by a surround sound processor generating an in-phase sound signal consisting of a front-left sound signal and a front-right sound signal, and an out-of-phase sound signal consisting of a rear-left sound signal and a rear-right sound signal, said in-phase sound signal and said out-of-phase sound signal communicating with an in-phase transmitter and an out-of-phase transmitter, respectively, and wherein said in-phase transmitter and said out-of-phase transmitter each consist of FM transmitters used to transmit an in-phase broadcast signal and an out-of-phase broadcast signal respectively;

a plurality of said receivers, each said receiver in wireless communication with said transmitter, each said receiver is capable of both remote and local signal level conditioning wherein graphic equalization, balance adjustment, fader adjustment, and volume adjustment are applied to the signal broadcast by said transmitter;

a graphic equalizer capable of adjustment of the tonal characteristics of the sound, on several bands, by use of individual sliding knobs including a balance knob allowing for the adjustment of the sound between the right and left channels, a fader knob allowing for the adjustment of the sound between front and rear channels, a volume knob allowing for the adjustment of the playing volume, a conditioning selection switch allowing a user to select the location of the signal conditioning for one particular receiver, and a channel selection knob allowing for individual channel selection on a per speaker basis;

a plurality of speakers, one said speaker in direct communication with one said receiver;

and wherein said individual receivers are identical in construction and can be configured to communicate with said transmitter to drive at least a front-left speaker, a front right-speaker, a center speaker, a rear-left speaker or a rear-right speaker;

wherein said in-phase sound signal and said out-of-phase sound signal are also fed, in parallel, to signal level conditioning circuitry, where said in-phase sound signal and said out-of-phase sound signal are further conditioned in terms of tonal characteristics of the sound, adjustment of the sound between the right and left channels, adjustment of the sound between front and rear channels and playing volume as defined by the user on the transmitter control panel via the graphic equalizer, balance knob, fader knob and volume knob, respectively.

2. The remote surround speaker system of claim 1, wherein said level conditioning circuitry further generates a conditioned in-phase sound signal consisting of a conditioned front-left sound signal and a conditioned front-right sound signal, and a conditioned out-of-phase sound signal consisting of a conditioned rear-left sound signal 75 and a conditioned rear-right sound signal;

and wherein the conditioned in-phase sound signal and the conditioned out-of-phase sound signal are fed to a conditioned in phase transmitter and a conditioned out-of-phase transmitter 81, respectively, said conditioned in-phase transmitter and said conditioned out-of-phase transmitter comprising FM transmitters used to transmit a conditioned in-phase broadcast signal and a conditioned out-of-phase broadcast signal.

3. A wireless surround sound speaker system comprising:

a transmitter unit connected to a conventional home entertainment or stereo system such that the audio signals generated by said home entertainment or stereo system are conveyed to said transmitter unit, said transmitter unit having surround sound signal processing means that produce a plurality of unconditioned surround sound audio signals from said audio signals, said transmitter unit having signal conditioning means that produce a plurality of conditioned surround sound audio signals from said unconditioned surround sound audio signals, said transmitter unit broadcasting said unconditioned surround sound audio signals and said conditioned surround sound audio signals via separate and distinct FM frequencies; and a receiver unit that receives said unconditioned surround sound audio signals and said conditioned surround sound audio signals broadcast by said transmitter unit, said receiver unit having speaker channel selection means whereby a selected speaker channel is isolated from said unconditioned surround sound audio signals and said conditioned surround sound audio signals, said receiver unit amplifying said selected speaker channel, driving a loudspeaker to which said receiver unit is connected.

4. The wireless surround speaker system of claim 3, wherein said receiver integrates both said loudspeakers in combination with integrating signal receiving, amplification, channel selection and graphic equalization capabilities.

5. The wireless surround sound speaker system of claim 3, wherein said signal conditioning applied by said transmitter unit further comprises left-right loudspeaker biasing, front-rear loudspeaker biasing, graphic equalization and volume controls.

6. The wireless surround sound speaker system of claim 3, wherein said receiver unit further comprises a signal conditioning means whereby said selected speaker channel received by said receiver unit is adjusted in terms of left-right loudspeaker biasing, front-rear loudspeaker biasing, graphic equalization and volume controls prior to amplification, said selected speaker channel being selected from said unconditioned surround sound audio signals.

7. The wireless surround sound speaker system of claim 3, wherein said unconditioned surround sound audio signals further comprise a front-left unconditioned surround sound audio signal, a front-right unconditioned surround sound audio signal, a rear-left unconditioned surround sound audio signal and a rear-right unconditioned surround sound audio signal.

8. The wireless surround sound speaker system of claim 3, wherein said conditioned surround sound audio signals further comprise a front-left conditioned surround sound audio signal, a front-right conditioned surround sound audio signal, a rear-left conditioned surround sound audio signal and a rear-right conditioned surround sound audio signal.

9. The wireless surround sound speaker system of claim 3, wherein said signal conditioning applied by said transmitter unit further comprises left-right loudspeaker biasing, front-rear loudspeaker biasing, graphic equalization and volume controls.

10. The wireless surround sound speaker system of claim 3, wherein said receiver unit is selectably powered by AC electricity supplied by a conventional wall socket or by a DC battery supply.

* * * * *